2,970,156

6-ALPHA-METHYL-21-METHOXY-PROGESTERONES

Frank H. Lincoln and George B. Spero, Kalamazoo, Mich., assignors to The Upjohn Company, Kalamazoo, Mich., a corporation of Michigan No Drawing. Filed Mar. 19, 1958, Ser. No. 722,393

1 Claim. (Cl. 260—397.45)

The present invention relates to steroid compounds and is more particularly concerned with 6-methyl-21-methoxyprogesterone of the following formula:

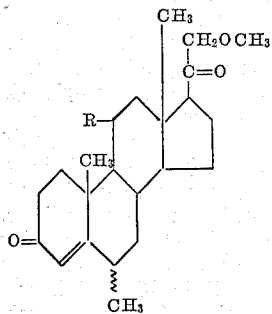

wherein R is selected from the group consisting of hydrogen, α-hydroxy, β-hydroxy and keto.

The novel 6-methyl-21-methoxyprogesterones of the present invention have utility as oral progestational agents of improved therapeutic value. For example, 6-methyl-21-methoxy-4-pregnene-3,11,20-trione when administered orally gives a progestational activity ten to twenty times that of progesterone. These compounds affect the secretion of gonadotropins and thus regulate ovulation and endometrial and placental development and, particularly when used in conjunction with estrogens, e.g., ethinylestradio and/or androgens, e.g., Halotestin (9α-fluoro-11β-hydroxy-17-methyltestosterone), reduce fertility, and constitute effective therapy for dysmenorrhea, amenorrhea, endometriosis, threatened abortion and related gynecological disorders.

The compounds of this invention can be prepared and administered to the animal organism in a wide variety of oral dosage forms singly, or in admixture with other co-acting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid comopsitions can take the form of solutions, emulsions, suspensions, syrups, or elixirs.

The process of the present invention comprises reacting a 6α-methyl-11-ketoprogesterone with ethyl oxylate and sodium methoxide in tertiary butyl alcohol followed by neutralization with acetic acid and bromination with bromine in the presence of sodium acetate, and finally reaction with sodium methoxide to give the corresponding 6-methyl-21-methoxyprogesterone. The process is more fully described in Example 1.

The following preparations and example are illustrative of the process and products of the present invention, but are not to be construed as limiting.

PREPARATION 1

*6-methyl-11α-hydroxyprogesterone*

Nitrogen was bubbled through a solution of two grams of 5α,11α - dihydroxy - 6β - methylpregnane-3,20-dione [Cooley et al., J. Chem. Soc., 4115 (1957)] in 360 milliliters of ethanol denatured with methanol for fifteen minutes. To this solution was added eighteen milliliters of 0.1 N sodium hydroxide solution which had, likewise, been treated with nitrogen. The mixture was allowed to stand under nitrogen for 21 hours, made slightly acid with acetic acid, and concentrated under reduced pressure, under sixty degrees centigrade to dryness. The residue was dissolved in 200 milliliters of ether and twenty milliliters of water, and the ether layer was separated, washed with dilute sodium bicarbonate and water, dried and evaporated to dryness to give 1.722 grams of 6-methyl-11α-hydroxyprogesterone containing 6β-methyl-11α-hydroxyprogesterone and 6α-methyl epimer. The 6α- and 6β-methyl epimers can be separated by fractional crystallization to give substantially pure 6β-methyl-11α-hydroxyprogesterone and 6α-methyl-11α-hydroxy-progesterone.

PREPARATION 2

*6α-methyl-11β-hydroxyprogesterone*

(a) *6α-methyl-11-ketoprogesterone 3,20-bis-(ethylene ketal).*—A mixture of 300 milligrams of 6α-methyl-11-ketoprogesterone, five milliliters of ethylene glycol, fifty milligrams of para-toluenesulfonic acid monohydrate and 100 milliliters of benzene was placed in a reaction flask which was equipped with a reflux condenser and a water trap so arranged that the condensed vapors passed through the water trap before returning to the reaction flask. The mixture was heated to reflux and was allowed to reflux for five hours while at the same time being agitated. The water of reaction formed was continuously removed by codistillation with the refluxing benzene and was collected in the water trap. The benzene solution was then washed with successive portions of a dilute sodium bicarbonate solution and water, and then dried. The residue remaining after evaporation of the solvent was crude 6α-methyl-11-ketoprogesterone-3,20-bis(ethylene ketal) which was recrystallized from ethyl acetate to give pure 6α-methyl-11-ketoprogesterone 3,20-bis(ethylene ketal). The theoretical structure was confirmed by infrared spectrum analysis.

(b) *6α-methyl - 11β - hydroxyprogesterone 3,20-bis-(ethylene ketal).*—To a suspension of ten grams of lithium aluminum hydride in 800 milliliters of ether was added tengrams of 6α-methyl-11-ketoprogesterone 3,20-bis-(ethylene ketal), dissolved in 500 milliliters of ether. This mixture was stirred for 45 minutes at room temperature after which time it was refluxed for one hour and then cooled and hydrolyzed with water. The precipitate and water were extracted repeatedly with ether and the combined ether extracts were evaporated after washing with water and drying with anhydrous sodium sulfate. The resulting crystalline residue was essentially a quantitative yield of crude 6α-methyl-11β-hydroxyprogesterone 3,20-bis-(ethylene ketal). The structure was confirmed by infrared spectrum analysis.

(c) *6α-methyl-11β-hydroxyprogesterone.*—To a solution of two grams of 6α-methyl-11β-hydroxyprogesterone 3,20-bis-(ethylene ketal), in 75 milliliters of acetone was added one milliliter of concentrated sulfuric acid in 25 milliliters of water and the resulting acidic admixture allowed to reflux for thirty minutes. The solution was then concentrated and water added until crystallization took place. The thus-obtained 6α-methyl-11β-hydroxyprogesterone was collected on a filter and purified by recrystallization from ethyl acetate to give pure 6α-methyl-11β-hydroxyprogesterone.

PREPARATION 3

6β-methyl-11β-hydroxyprogesterone from 6β-methylprogesterone

A medium was prepared from 0.5 percent peptone, two percent dextrose, 0.5 percent soybean meal, 0.5 percent monobasic potassium phosphate ($KH_2PO_4$), 0.5 percent sodium chloride and 0.3 percent yeast extract in tap water. To 200 milliliters of this sterilized medium was added an inoculum of the vegetative mycelia of *Cunninghamella blakesleeana*. The spores had first been transferred from a spored slant to a broth medium and the broth medium was aerobically incubated at 24 degrees centigrade for 24 to 72 hours in a reciprocating shaker until the development of vegetative growth. The inoculated medium containing added vegetative mycelia of *Cunninghamella blakesleeana* was incubated for 48 hours at 24 degrees centigrade following which was added 66 milligrams of 6β-methyl-progesterone in solution in a minimum of ethanol, and incubation was maintained for seven hours at 24 degrees centigrade. The beer containing steroid was diluted with 800 milliliters of acetone, shaken one hour on a reciprocating shaker and filtered. The cake was suspended in 500 milliliters of acetone, shaken another hour and again filtered. The filtrates were combined and the acetone was volatilized under reduced pressure at fifty degrees centigrade. Acetone was then added, if necessary, to bring the concentration to twenty percent acetone and this resulting aqueous acetone solution was extracted five times each with one-third volume of Skellysolve B petroleum ether to remove fatty materials. These extracts were back washed two times with one-tenth volume of twenty percent aqueous acetone and the washings were added to the main acetone extract. The combined acetone extracts were extracted six times with one-fourth volumes of ethylene dichloride and the ethylene dichloride extract was evaporated under vacuum to leave the steroid residue. The steroid residue thus produced was then chromatographed and recrystallized to give pure 6β-methyl-11β-hydroxyprogesterone.

EXAMPLE 1

6α-methyl-11-keto-21-methoxyprogesterone from 6α-methyl-11-ketoprogesterone A solution of 6.84 grams (0.02 mole) of 6α-methyl-11-ketoprogesterone in seventy milliliters of tertiary butyl alcohol was prepared by heating to 55 to 60 degrees with stirring under a nitrogen atmosphere. While the temperature was held at this point 11.7 grams of ethyl oxalate was added. Thereafter 2.7 grams of sodium methoxide in methanol (25 percent solution) was added. Almost immediately the yellow precipitate of the disodium enolate of 6-methyl-2,21-diethoxyoxalyl-11-ketoprogesterone began to precipitate. The temperature was maintained at fifty to sixty degrees centigrade for fifty minutes after which the mixture was allowed to cool slowly to approximately 35 degrees centigrade in the next fifteen minutes.

A solution of 2.44 grams of anhydrous sodium acetate and 3.00 grams of glacial acetic acid in 160 milliliters of methanol which had been previously cooled to ten degrees centigrade was then added and the mixture stirred until the solution was achieved. The yellow solution was cooled to zero degrees and treated dropwise, with vigorous stirring, with a precooled (to zero degrees centigrade) solution of 9.6 grams of bromine in 96 milliliters of methanol. Approximately 75 milliliters of the bromine solution was added at a constant rate during ten minutes. The rate of addition was then decreased and the remaining 21 milliliters added during the following ten minutes. After an additional ten-minute stirring period, the bromine color had essentially disappeared.

With continuous stirring and cooling a solution of 5.57 grams of sodium methoxide in methanol (25 percent solution) was added rapidly. A bright orange color developed which soon faded to yellow amber. The cooling bath was removed, the temperature raised to 25 to 30 degrees centigrade and the mixture stirred for 1.5 hours.

Sixteen milliliters of acetic acid and 3.2 grams of zinc dust was added to this material and stirring continued for a period of thirty minutes. The excess zinc dust was removed by filtration and washed with fifteen to twenty milliliters of fresh methanol. The combined filtrate was concentrated at reduced pressure in a sixty degree water bath to approximately a 200-milliliter volume. The concentrate was poured slowly with stirring into 750 milliliters of ice and water. The mixture was refrigerated for fifteen minutes and then filtered. The filter cake was washed with 100 milliliters of cold water and dried at room temperature giving 7.02 grams of a slightly gummy crude product containing 6α-methyl-11-keto-21-methoxyprogesterone.

A 1.5 grams portion of the crude material was dissolved in fifty milliliters of benzene and poured onto a chromatographic column, previously charged with 75 grams of Florisil synthetic magnesium silicate. The column was eluted with 750 milliliters of a mixture of five percent acetone-95 percent Skellysolve B hexane. The eluate was collected in 150-milliliter fractions and evaporated. Fractions 1 to 4, inclusive, contained a crystalline product which was recrystallized from ethyl acetate-Skellysolve B hexane to give prisms of pure 6α-methyl-11-keto-21-methoxyprogesterone melting at 179 to 181 degrees centigrade, having a rotation of $[\alpha]_D$ plus 224 degrees in chloroform, and an ultraviolet absorption $$\lambda_{max}^{alc.} \ 238 \ m\mu, \ a_M \ 15{,}150$$

*Analysis.*—Calculated for $C_{23}H_{32}O_4$: C, 74.16; H, 8.66; $OCH_3$, 8.33. Found: C, 73.97; H, 8.76; $OCH_3$, 9.67.

In the same manner, substituting 6β-methyl-11-ketoprogesterone for 6α-methyl-11-ketoprogesterone in Example 1, is productive of 6β-methyl-11-keto-21-methoxyprogesterone. Similarly, the substitution of other 6-methylprogesterones as starting materials, such as 6α-methylprogesterone, 6β-methylprogesterone, 6α-methyl-11α-hydroxyprogesterone, 6β-methyl-11α-hydroxyprogesterone, 6α-methyl-11β-hydroxyprogesterone, and 6β-methyl-11β-hydroxyprogesterone in place of 6α-methyl-11-ketoprogesterone in Example 1, is productive of 6α-methyl-21-methoxyprogesterone, 6β-methyl-21-methoxyprogesterone, 6α-methyl-11α-hydroxy-21-methoxyprogesterone, 6β-methyl-11α-hydroxy-21-methoxyprogesterone, 6α-methyl-11β-hydroxy-21-methoxyprogesterone and 6β-methyl-11β-hydroxy-21-methoxyprogesterone, respectively.

The starting materials used in the above preparations and example may be obtained as follows: 5α,11α-dihydroxy-6β-methylpregnane-3,20-dione and 6α-methyl-11α-hydroxyprogesterone [Cooley et al., J. Chem. Soc., 4115 (1957)]; 6α-methylprogesterone and 6β-methylprogesterone [Burn et al., J. Chem. Soc., 4097 (1957)], and 6α-methyl-11-ketoprogesterone and 6β-methyl-11-ketoprogesterone [Spero et al., J. Am. Chem. Soc., 78, 6213 (1956)].

It is to be understood that the invention is not to be limited to the exact details of operation or exact compounds shown and described, as obvious modifications and equivalents will be apparent to one skilled in the art, and the invention is therefore to be limited only by the scope of the appended claim.

We claim:

6α-methyl-11-keto-21-methoxyprogesterone.

References Cited in the file of this patent

UNITED STATES PATENTS 2,183,589     Reichstein et al. _____ Dec. 19, 1939

FOREIGN PATENTS 641,618     Great Britain _____ Aug. 16, 1950